Oct. 6, 1931. R. W. BABSON 1,826,492
AUTOMATIC CONTROL FOR SELF PROPELLED VEHICLES
Filed Nov. 14, 1928 7 Sheets-Sheet 1

Inventor:
Roger W. Babson,
by Wright, Brown, Quinby & May
Attys.

Oct. 6, 1931.   R. W. BABSON   1,826,492
AUTOMATIC CONTROL FOR SELF PROPELLED VEHICLES
Filed Nov. 14, 1928   7 Sheets-Sheet 2

Inventor:
Roger W. Babson,
by Wright, Brown, Quinby & May
Attys.

Oct. 6, 1931.  R. W. BABSON  1,826,492
AUTOMATIC CONTROL FOR SELF PROPELLED VEHICLES
Filed Nov. 14, 1928   7 Sheets-Sheet 3

Inventor:
Roger W. Babson,
by Wright, Brown, Quinby & May
Attys.

Oct. 6, 1931.  R. W. BABSON  1,826,492
AUTOMATIC CONTROL FOR SELF PROPELLED VEHICLES
Filed Nov. 14, 1928　　7 Sheets-Sheet 5

Inventor:
Roger W. Babson
by Wright, Brown, Quinby May
Atty's.

Oct. 6, 1931.  R. W. BABSON  1,826,492
AUTOMATIC CONTROL FOR SELF PROPELLED VEHICLES
Filed Nov. 14, 1928  7 Sheets-Sheet 7

Inventor:
Roger W. Babson,
by Wright, Brown, Quinby & May
Attys.

Patented Oct. 6, 1931

1,826,492

UNITED STATES PATENT OFFICE

ROGER W. BABSON, OF WELLESLEY, MASSACHUSETTS

AUTOMATIC CONTROL FOR SELF PROPELLED VEHICLES

Application filed November 14, 1928. Serial No. 319,296.

The invention herein disclosed relates to electrically driven or controlled vehicles, and particularly to cars, carriages, locomotives, or the like, adapted to run on railway lines and to be operated as common carriers. Within this classification are included all such vehicles as are guided by rails and equipped with propelling means, which may be electric motors supplied with current either from a distant source through transmission lines, or from a generator or battery carried by the vehicle, and also those which may be equipped with other prime movers which are capable of being controlled electrically.

The primary objects of the invention are to enable the services of specially trained motormen or engineers to be dispensed with in the operating units of a transportation line; to eliminate the expense of a second man in the cab of an electric locomotive or similar vehicle; and to provide an additional safeguard for the vehicles of such transportation lines effective to assure safe arrival of cars or trains at their destinations in case of incapacity of the driver. In other words, the object is to increase the safety and diminish the operating expense of common carriers.

In the effort to reduce operating costs many companies have reduced the crews of their cars, particularly on runs where the traffic is light, to one man, whose duties include not only running the car, but also the collection of fares as well. But this practice has the drawback that the motorman, whose function is primarily to operate the car, is liable to be less vigilant in noticing prospective passengers and in collecting fares from those who enter the car than is a person whose primary duty is to collect fares; and also that the motorman must hold the car at a standstill while collecting fares, thus wasting the time of patrons.

I have conceived that these drawbacks would be overcome if the single attendant, or the one man crew of the car, were made the conductor, or guard, or fare collector, having as his primary duties to keep an outlook for passengers and for their safety in mounting and alighting, and to collect their fares. Thus the revenue earned by each car would be increased without sacrifice of the economy effected by employing a single person only as the crew.

In realizing this conception, I have devised means for operating the car automatically, but under the supervision and control of the attendant. That is, while the attendant has full power to stop and start the car at will, nevertheless the running of the car between stops, including the increase and decrease of power on grades and to maintain a time schedule, giving warning signals at stated points, applying and releasing the brakes, and stopping the car at designated stations, is performed automatically. The invention comprises means for effecting such automatic control of a car, and the combination of such means with the super-control, or voluntary control means adapted to be operated at will by the attendant, and also the means by which an original control element or record for such automatic control is made in the first instance.

To summarize briefly the embodiment of the invention herein disclosed, a car is equipped with a spool holding a rolled strip of paper, analogous to the rolls of paper used to control automatic pianos and some other musical instruments, and with means for propelling the paper at a rate proportional to the travel of the car, and printing or marking devices arranged to apply marks to the traveling paper under control of the various agencies by which the car is driven and stopped, its speed accelerated and diminished, etc. These agencies are employed in the following manner to provide a record of prescribed operations suitably performed and to produce a master controller for automatically reproducing such operations afterward. The car so equipped is driven over a prescribed run or section of the railway line by a skilled motorman, who operates the car according to the needs of the normal traffic on the line with maintenance of a prescribed schedule; stopping at all the designated stations, sounding a warning signal at all points where such a signal is required, and applying power or shutting it off, applying and releasing the brakes, etc., as needed to maintain the schedule and operate the car in a satisfactorily efficient way. The marking or printing devices print dashes or stripes on the traveling paper in different locations appropriate to the several control agencies, and for lengths proportional to the distance traveled by the car while such agencies are respectively in action.

After the record has been thus made, the paper is removed and the marked areas are cut out, leaving perforations and slots which make the paper strip suitable to serve as a controller record or as a master record from which duplicate controller records can be made.

Such controller records are then applied to the cars equipped for automatic operation and are driven, as before, by the forward travel of the car; but in this situation the slots in the record serve to permit closing of contacts in various electric circuits to initiate action of the several car operating means. In this way an automatic operation of the car is accomplished similar to that performed by the master motorman in making the original record.

Besides this I have provided time control means operable when the actual progress of the car fails to correspond with the intended time schedule, to decrease or increase the speed of the car automatically accordingly as the car runs ahead of schedule or behind time. Over all is the manual control means to be actuated by the attendant for starting the car after stops, for stopping it any time in case of emergency, and for continuing it in motion past ordinary stopping places when there are no passengers to be taken on or left at such places.

The foregoing control means may be combined with external controls operated by the car in a known manner, or otherwise suitably, in traversing the track for throwing on and off signal lights, or other signals at intersections with streets and other highways. In applying the conventional system of traffic signal lights, including stop, cautionary and go signals, a switch located far enough in advance of the crossing is operated to illuminate the cautionary signal. Further on a switch connected to the "stop" signal is operated when the car passes; and during, or after, its passage across the intersecting road, the car operates another switch to turn on the signal which indicates that cross traffic may proceed. Similar controls are located along the track at either side of the intersection, so that cars passing in either direction may operate the signals. The car is thus given the right of way and controls the intersecting traffic.

In cases where the car track runs on or beside a highway for other vehicles and automatic signals are provided to direct the intersecting lines of traffic, the electrical control means governed by the car may cause a temporary disablement of the automatic control and either operate the lights of the automatic control or a separate set of lights. Thus it may cause the light which is visible to traffic passing in the same and opposite directions as the car to continue giving the "go" signal, without automatic interruption, while the car approaches and crosses the intersecting street; and at the same time causing the cautionary and stop signals on the intersecting street to glow, restoring the automatic operation when it has passed the intersection.

In this control of traffic by the car, I may use means and apparatus already known, such as those applied to railroad crossings.

Having thus outlined the general principles of the invention, I will now describe the details of one specific form, with reference to the drawings.

Fig. 17 is a detail sectional view showing the means for driving the spool by which the paper strip is propelled;

Fig. 18 is a detail cross section on line

18—18 of Fig. 17 showing the coupling between the spool and its driving means;

Like reference characters designate the same parts wherever they occur in all the figures.

I will now describe in detail the specific embodiment of the invention shown in these drawings, making it understood at the same time that the principles of the invention may be embodied in numerous diverse forms and arrangements of elements more or less dissimilar superficially to the illustration, but fundamentally equivalent thereto. Referring to Figs. 1, 3 and 4, 22 represents a box having a removable cover 23 and containing, among other things, a rotatably mounted spool 24 (supply spool) holding a rolled up strip of paper 25, (the "record strip" previously referred to), a rotatable take-up spool 26, a bed roll 27 over which the paper passes between said spools, and tension or guide rolls 28 and 29 on opposite sides of the bed roll, under which the paper passes and by which it is held closely against the bed roll and caused to travel smoothly over it. The strip may be detachably connected to the take-up spool by a rod 25a (Fig. 17) secured crosswise of the strip to the end thereof, and long enough to pass through slots in both heads of the spool, having washers 25b on its own ends overlapping the slots at the outer sides of the spool heads.

Figures 1, 2:
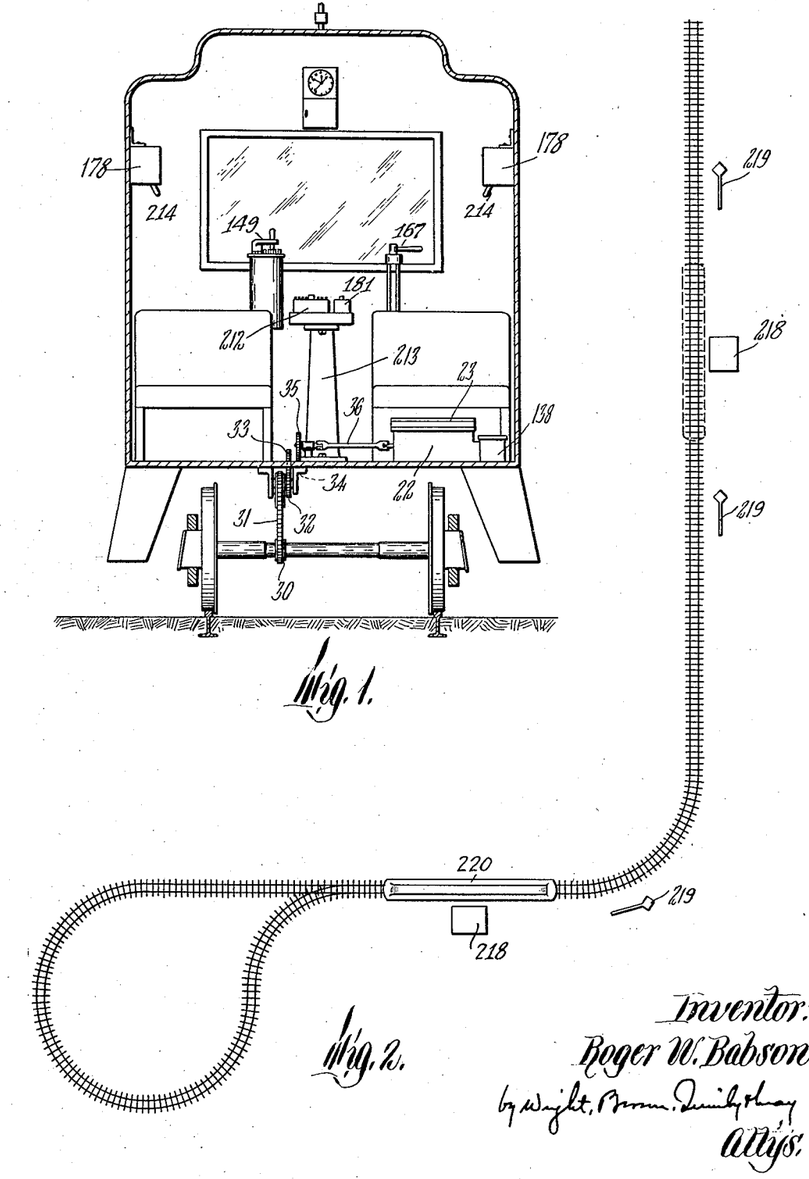
Fig. 1 of the drawings is a cross section of a street railway car showing parts of the automatic and manual control means of this invention in their proper positions.
Fig. 2 is a plan view of a portion of a railway line to which the automatic control of cars according to this invention is adapted.

The box 22 may be placed in any convenient location in the car, such that power to drive the take-up spool may be derived from the wheels of the car. Fig. 1 shows a suitable driving mechanism comprising a sprocket 30 on one of the wheel axles, a transmission sprocket chain 31, a reducing gear train 32, 33, 34 and 35, and a flexible shaft 36 driven by the last gear of the train. A flexible shaft is preferably used in this mechanism to afford latitude and flexibility in the positioning of the box.

Figure 3:
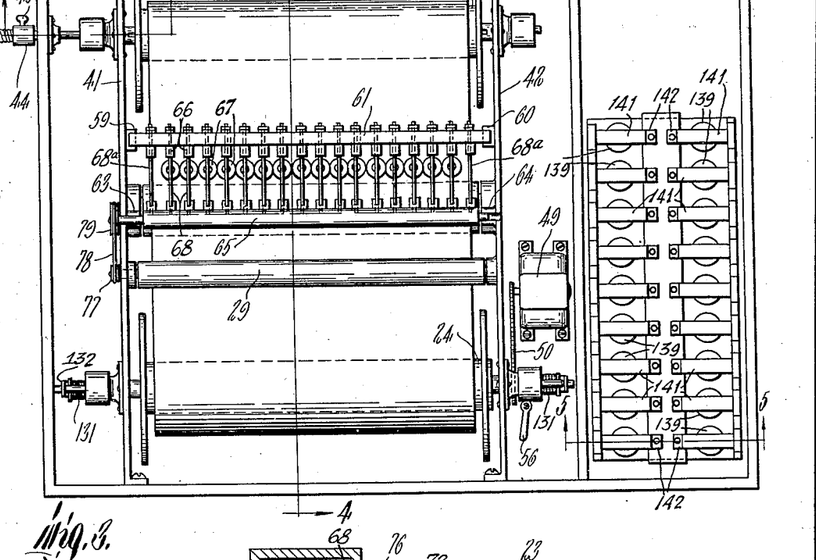
Fig. 3 is a plan view of means for holding and propelling a record strip of paper and printing thereon a record of operation of the car under control of the motorman.
Figures 17, 18:
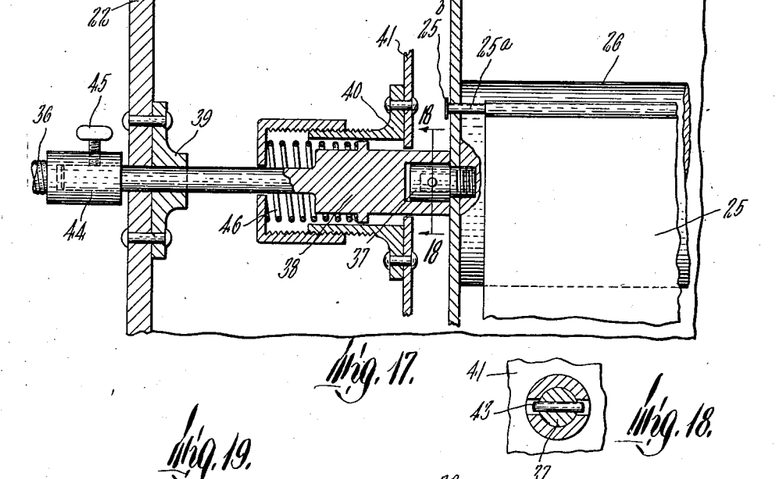

A form of coupling adapted to connect the flexible shaft with the take-up spool, and permit disconnection for rewinding of the paper on the supply spool after the end of the run, is shown in detail in Fig. 17. One of the trunnions 37 of the spool enters a socket in the end of a shaft section 38 which is held rotatably in a bearing 39 fastened to one of the walls of the box, and in a second bearing 40 fastened to a plate 41, suitably secured in the box, as shown in Fig. 3. (This plate cooperates with a similar plate 42 to provide a frame by which the spools and rolls previously mentioned, as well as other parts later described, are supported.) A pin 43 carried by the spool trunnion enters slots in the socketed end of shaft 38. The protruding end of this shaft enters a sleeve 44, secured to the shaft 36, in which it is fastened by a set screw 45. Thus rotation is transmitted to the spool. For uncoupling the spool to permit rewinding of the paper, sleeve 44 is disconnected from shaft 38. A spring 46 presses the socket end of shaft 38 against the spool. The opposite trunnion of the spool is received in a similar spring-pressed socket borne by the plate 42.

Figure 19:
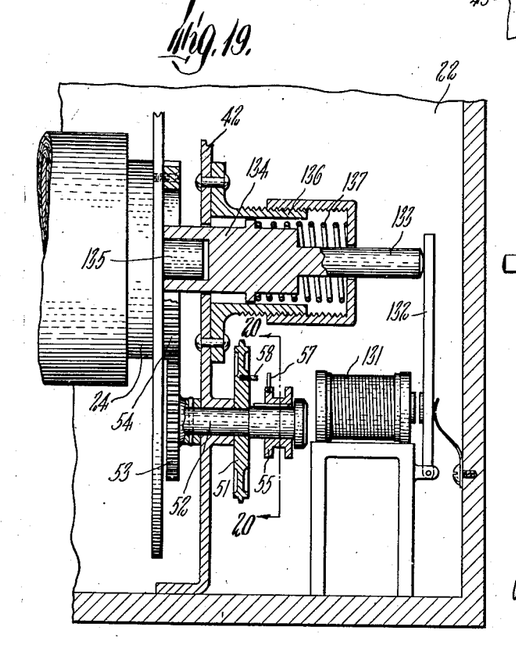
Fig. 19 is a sectional detail view showing the tracker means for causing the paper strip to travel in a given path.
Figure 20:
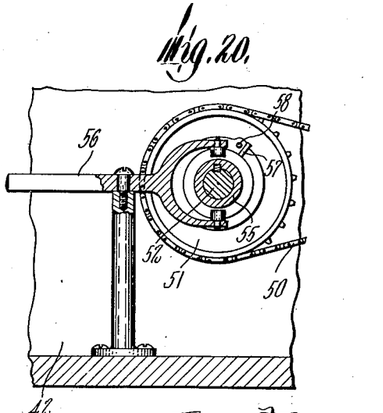
Fig. 20 is a sectional view on line 20—20 of Fig. 19 showing the means for rewinding the paper strip on its normal holding spool.

For rewinding the paper, there is a small electric motor 49 (Fig. 3) mounted in the box, having its armature shaft connected by a sprocket chain 50 with a sprocket wheel 51 (Fig. 19) loose on a shaft 52 which has a bearing in the plate 42 near the supply spool 24 and carries a gear 53 in mesh with a gear 54 secured to the adjacent end of the latter spool. A clutch 55 is splined on shaft 52 and is movable by a clutch shifter 56 (Figs. 3 and 20) into and out of coupled connection with the sprocket wheel 51. The coupling members for this purpose illustratively shown here are a pin 57 projecting from the rim of the clutch member 55 and a cooperating pin 58 projecting from the side of the sprocket wheel. It will be understood by those skilled in the art, without further description, that the rewind motor may derive current, suitably reduced in pressure and quantity, from the service supply of the car, and is provided with its own switch to be manually operated by the attendant, so that it will run only when needed to rewind the strip.

Figure 4:
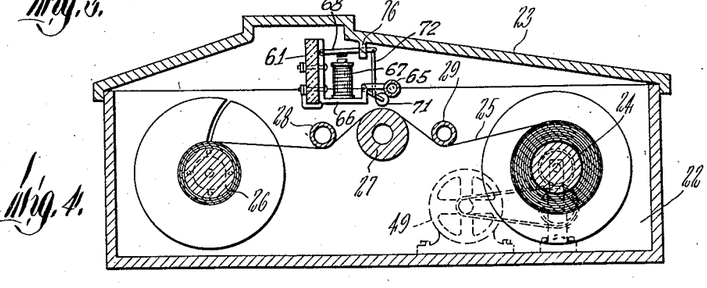
Fig. 4 is a cross section of the same means taken on line 4—4 of Fig. 3.
Figures 12, 13, 14, 15, 16:
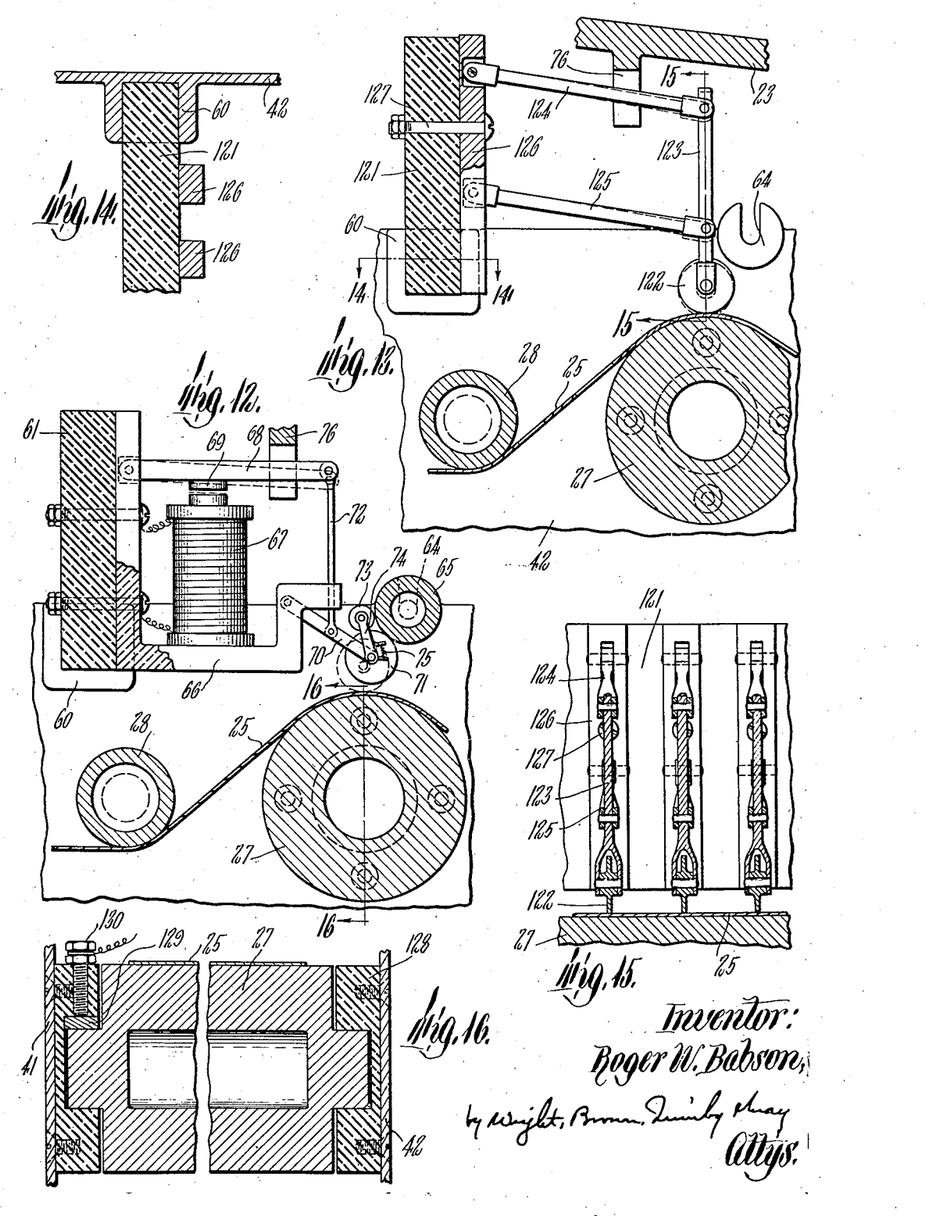
Fig. 12 is an enlarged sectional view of a part of the printing mehanism shown in Figs. 3 and 4.
Fig. 13 is a view similar to Fig. 12 showing a circuit closing contact device substituted for the printing mechanism to effect automatic control of the car operating means.
Fig. 14 is a cross section on line 14—14 of Fig. 13.
Fig. 15 is a cross section on line 15—15 of Fig. 13.
Fig. 16 is a cross section on line 16—16 of Fig. 12.

The box also includes means for interchangeably supporting printing devices in position to print on the paper passing over the bed roll 27 when the record is being made, and the circuit closing devices adapted to make contact with the bed roll, through slots or holes in the paper, when the car is being operated automatically. I will first describe the printing means, which are shown in Figs. 3, 4 and 12. On the inner sides of the frame plates 41 and 42 are socketed lugs 59, 60, which receive, position and support a bar 61; and other socketed lugs 63 and 64 which similarly hold the trunnions of an ink roll 65. To the bar 61 are secured a series of brackets 66, each supporting an electro-magnet, solenoid, or the like, 67, a pivoted lever 68 carrying an armature 69 for the magnet, or equivalent core for the solenoid, and a pivoted lever 70 carrying a printing disk or the like 71, and connected to lever 68 by a link 72. The printing disk is so arranged that when the armature is attracted by the magnet, it is lowered and pressed against the surface of the paper traveling over the bed roll 27, but at other times is raised clear of the paper by a spring, not shown here, but which may be connected and located in any one of many ways well understood by the skilled mechanic.

The ink roll 65 in turn is arranged where it will supply ink to the printing disk 71 and other similar disks. This roll is preferably covered with a thick absorbent pad or wrapping saturated with ink. It is so located that all of the printing disks, when displaced from the paper, as shown by Fig. 12, are brought into contact at their rims with the ink saturated cover of the roll. In order to continue transfer of ink to any disk which may remain continuously in contact with the paper for an extended length of time, that is, while the paper travels more than the length of the circumference of the disk, I provide such disk with an intermediate transfer roll 73 carried by an arm or yoke 74, which is pivoted at the axis of the disk, the transfer roll being always in contact at its rim with the rim of the disk, and forced by a spring 75 constantly against the ink supplying surface of the ink roll.

There are as many brackets 66, with their magnets and printing disks, as there are agencies or elements to effect the automatic operation of the car; and in addition are two tracker controllers, 68a, similar to those later described in connection with the contact devices, adjacent to the opposite edges of the paper, for causing the paper to travel in a given path. The levers 68 of the several printing attachments are guided and prevented from interfering with one another by a rib 76 on the inside of the box cover 23, such rib having slots in which the armature levers are received.

The ink roll is preferably rotated constantly while the paper is in motion in order to constantly renew the inked surface in contact with the printing disks and their transfer rolls. Power for thus rotating the ink roll may be derived from various sources, for instance, from the traction of the traveling paper itself, exerted through one of the guide rolls, as 29, which is rotated with the paper and carries a pulley 77 driving a belt 78 which in turn drives a pulley 79 on one of the trunnions of the ink roll.

Figures 6, 7, 8, 9, 10, 11:
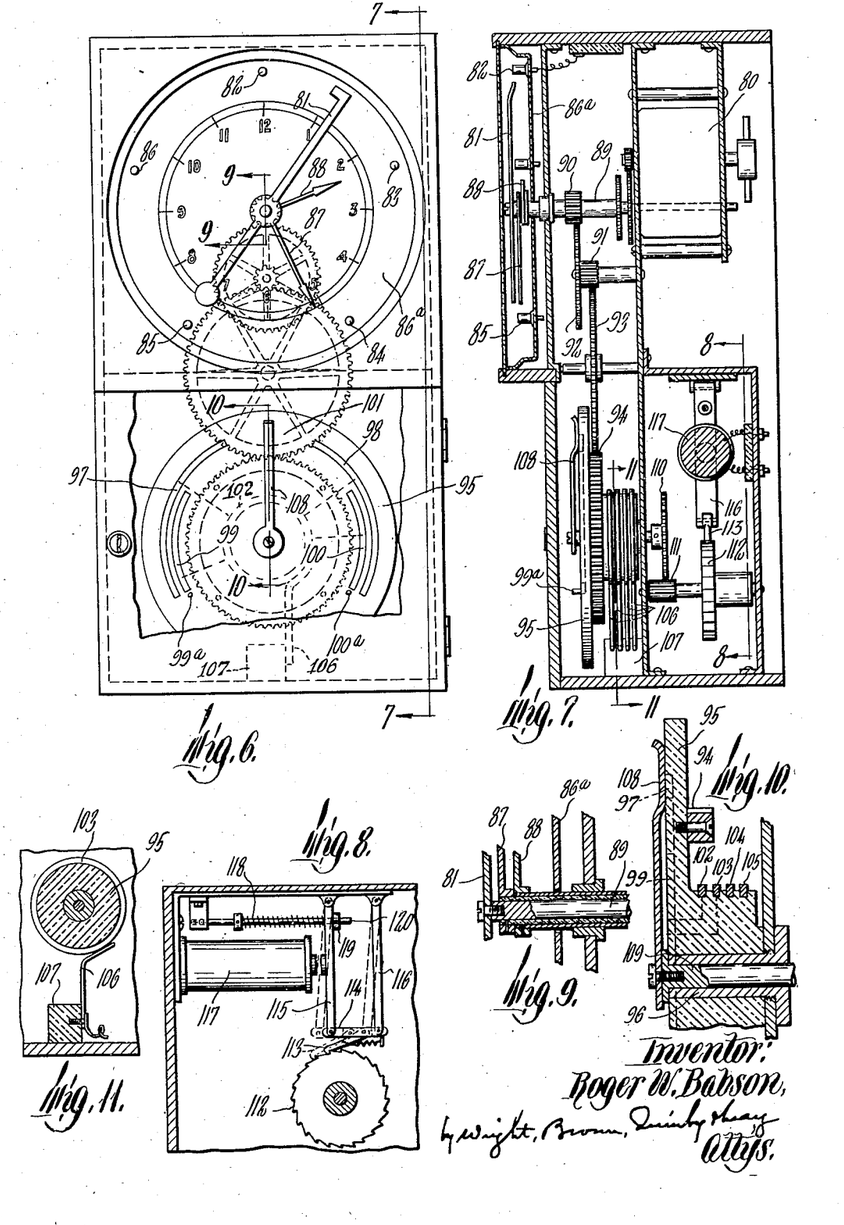
Fig. 6 is a plan view of the automatic time control means for maintaining in some measure a given time schedule in the automatic operation of the car.
Fig. 7 is a sectional elevation as seen from line 7—7 of Fig. 6.
Fig. 8 is a sectional elevation on line 8—8 of Fig. 7.
Figs. 9, 10 and 11 are detail views of the same mechanism, Fig. 11 being a section on line 11—11 of Fig. 7.

I have provided further a means for recording time intervals on the paper strip to the end that, when the car is run automatically, its running speed may be automatically accelerated or retarded if its progress falls behind or exceeds the progress during the run when the record is made. This device is shown in Figs. 6 and 7, and consists of a clock motor 80 which drives an arm or traveling brush 81 arranged to sweep over and engage stationary contacts 82, 83, 84, 85 and 86, which are distributed equidistantly apart in a circumference about the axis of the brush 81. Said brush and contacts are in circuit with the magnet of one of the printing disks and cause the latter to print marks on the paper at equal time intervals, but at distances apart varying with the speed of the car. It is immaterial what the specific nature of the clock motor may be, or what time intervals are selected, provided only the motor is one which travels at a uniform rate of speed; but I prefer to use a spring driven clock motor and to drive the brush at the rate of one revolution per minute, providing five equally spaced contacts so that a time mark is made every twelve seconds. The motor is preferably equipped also with a time dial 86a and the usual minute and hour indicating hands 87 and 88 of a clock.

The time motor also drives a part of the means which affects the progress of the car when behind or ahead of schedule in its automatic runs, the cooperating part of such means being operated electrically when a circuit is completed through perforations in the paper made at the points indicated by the time record impressions. The mechanism of this means, which may for convenience be called the schedule regulating means, will now be described, description of the electrical part thereof being reserved for inclusion with a comprehensive explanation of the entire electrical equipment of this invention.

Referring again to Figs. 6 and 7, the shaft 89, which propels the contact brush 81, also drives a gear train 90, 91, 92, 93 and 94, the last gear of which is made fast to a disk 95 turning on a hollow pivot 96 which is suitably mounted stationary in the frame supporting the various parts of this mechanism. The disk is of insulating material and carries on its face exposed contact strips or segments 97, 98, 99 and 100. The segments 97 and 98 are separated from one another by the space at 101 at one side of the center of the disk, while the segments 99 and 100 are symmetrically arranged with respect to the first two segments and separated from each other by a wider space at the same side of the center. Segments 97 and 99 are likewise separated from 98 and 100 at the opposite side of the center by a space of any convenient width. These segments are severally connected electrically by means of conductors embedded, or passing through suitably disposed holes, in the substance of the disk, as shown diagrammatically in Figs. 6 and 10, with slip contact rings 102, 103, 104 and 105 surrounding the hub of the disk, the latter being in sliding contact with separate brushes 106 secured to an insulating block 107 (Figs. 7 and 11). A contact arm or traveling brush 108, arranged to cooperate with the segments 97, 98, 99 and 100, is secured to a shaft 109 which is mounted to rotate in the hollow pivot 96. Shaft 109 carries a gear wheel 110 meshing with a pinion 111 in rigid connection with a ratchet wheel 112. A pawl 113 for driving this ratchet is carried by a pawl carrier 114 suspended by links 115 and 116 from an overlying wall of the casing, substantially as shown in Fig. 8. The link 115 carries the armature of an electro-magnet 117 and is normally pressed away from the magnet, by a spring 118, to the limit permitted by a stop collar 119 on a fixed rod 120, which moves the pawl slightly more than the distance from one tooth to the next of the ratchet. Thus with each making of the circuit containing the electro-magnet, the pawl is retracted to engage the next following tooth of the ratchet, and with each breaking of the circuit the spring advances the pawl and turns the ratchet a step.

The movement given to contact arm 108 and the value of the gear train driving disk 95 are such that, if the magnet circuit is completed with the same frequency as the contacts between arm 81 and contact points 82, etc. are made (that is, every twelve seconds in the present illustration), the arm 108 and the disk 95 travel at the same speed in the same direction and the arm remains in its original relative position with respect to the disk, that is, in the middle of the gap 101. But if the magnet impulses are less frequent than this, caused by lagging of the car behind its intended schedule, the arm 108 moves slower than the disk and eventually makes contact with the segment 98. This completes an electrical circuit, later explained, and cuts out a resistance element normally in the circuit of the car motor, causing the car to progress faster. If the car gains time by this means, the arm 108 eventually regains its former position out of contact with the segment and the motor resistance is cut in again; but if the car loses still more time, the arm 108 lags still further until it completes the circuit through the segment 100, cutting out a second resistance and causing further increase in the speed of the car. Conversely, if, by reason of light traffic causing shorter station stops or omission of some stops, the car tends to run ahead of schedule, the arm 108 gains on the disk and makes contact with segment 97, or both segments 97 and 99, causing additional resistance to be brought into the car motor circuit, reducing its speed. The resistance elements thus put in and out of circuit with the car motor are additional to and in series with those by which the normal starting and acceleration of the motor are effected and, if the car is behind time or ahead of time when at any stopping place, cause more or less than the normal current, as the case may be, to pass to the motor when the starting resistances are cut out. Any desired number of accelerating or retarding resistances additional to the two of each type here indicated may be used in the schedule governing part of the equipment, if desired. Stops 99a and 100a at the ends of the segments arrest the arm and prevent it from separating from the segments in case the means just described should fail to check increasing departure of the car from schedule.

When the printing attachments have completed their work, they are removed and contact devices, adapted to complete the various control circuits when permitted by slots in the perforated controller record, are substituted. The nature of these contact devices is shown in Figs. 13 and 15. They are all secured to a bar 121, of insulating material, similar to the bar 61, which replaces the latter in the lugs 59 and 60. Each contact device consists of a wheel or disk 122 rotatably mounted in a fork carried by a bar 123, which is connected by parallel links 124 and 125 to a block 126 secured to the bar 121. The parts thus interconnected are of conducting material and adapted to conduct electric current between the contact wheel 122 and a binding screw 127 to which the wire of an electric circuit is connected. These various contact wheels are held steady in their prescribed locations by their links 124 in the notches of the same slotted rib 76 of the cover which similarly steadies the operating levers 68 of the printing disks.

In showing and describing the contact piece 122 as a wheel, I have not intended to indicate a specific limitation in this element of the invention, as any other suitable contact device adapted to pass through a slot in the paper strip and to be separated from the bed roll by the advancing paper at the end of the slot is equivalent to the wheel and may be used in place thereof.

The bed roll 27 is a part of all the circuits in which the contact wheels 122 are contained. Hence it is made of conducting material, or at least has a surface of such material. Fig. 16 shows the manner in which it may be connected in circuit. As here shown, it has trunnions contained in bearings 128 of insulating material, and one of the trunnions is in contact with a brush 129 with which is engaged a binding screw 130.

It is necessary that the paper strip travel in approximately the same path when used to control the car as when being originally printed. For this purpose the endmost contact disks of the series are connected in circuit with electro-magnets adjacent to the ends of the supply roll and organized to apply an endwise thrust thereto. One of such magnets is shown at 131 in Fig. 19. It is arranged to attract an armature lever 132 extending across the end of the stem 133 which protrudes from a socket piece 134 receiving the trunnion 135 of the spool and contained in a holder 136, under pressure of a spring 137 which constantly urges it toward the adjacent head of the spool. Both trunnions are held in this way, and the yielding arrangement of the sockets makes it easy to put the spool in place and remove it. The travel controlling contacts are located close to the opposite edges of the paper strip, but in such positions that both are out of contact with the bed roll when the paper is in mid position. But if the paper travels off ever so slightly to either side, the contact piece at the side from which it recedes closes the circuit of the magnet at the opposite side and the latter exerts a pressure on the spool until the paper returns to normal position and breaks the circuit again. The tracker controlling devices 68a previously mentioned in connection with the printing attachments, are like those just described and are mounted on the bar 61 at opposite ends of the series of printing attachments.

Figure 5:
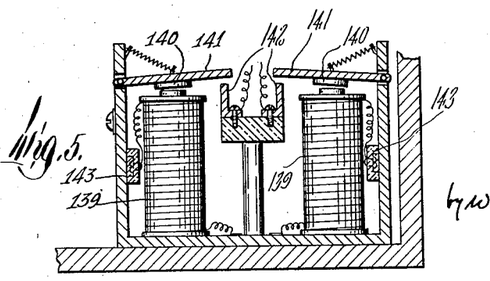
Fig. 5 is a detail cross section taken on line 5—5 of Fig. 3.

Current for the electrical equipment of this invention is taken from the power supply, but greatly reduced in quantity and voltage in order to avoid sparking, particularly such sparking at the record controlled contacts as would be liable to burn the paper or other material of which the record is made. Preferably it is so reduced to a value of about one half ampere, by a resistance inserted in the line leading to the record controlled devices. This current is insufficient to operate the magnets of the relay switches by which the motor circuits are controlled, or to effect application of the brakes and sounding of the warning signal, wherefore intermediate relays are provided to be operated by the currents passed through the record controlled contacts, and to pass more powerful currents for performing the ultimate operations. These relays are conveniently housed in a compartment 138 of the box 22, as shown in Figs. 3 and 5. There are as many such relays as may be required for effecting all the operations involved in running the car automatically; for instance, nine for controlling the speed of the motor, three for operating the air brakes, four for the schedule regulating switches, one for the warning signal, and one for the magnet 117 which assist in propelling the switch disk 95 of the schedule regulator.

These relays may be all alike, each comprising an electro magnet 139 and an armature 140 carried by a switch lever 141 to make contact with a complemental contact 142. By placing them all in a metal frame, as is done in this case, the negative terminals of the magnet windings, and the switch levers may all be electrically connected with such frame and the latter connected to the negative lead of all the circuits. The positive connection for each magnet winding is made through an insulated binding post 143 mounted on the frame, while the positive sides of the several relay circuits are separately connected to the several contacts 142, which are all separate from each other and mounted on an insulated support.

Figure 21:
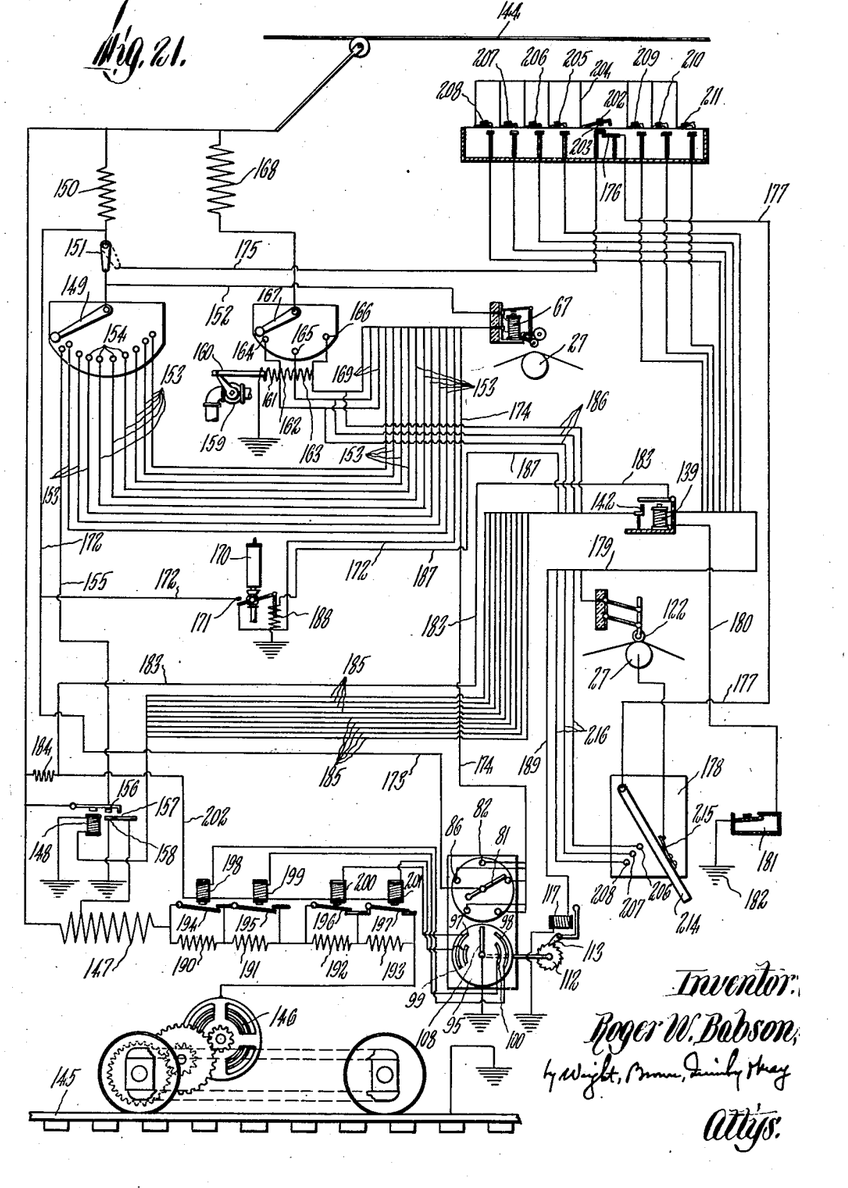
Fig. 21 is a diagram of electrical circuits and connections illustrating the principles according to which the printing means and various control elements are operatively connected for the purposes in view.
Figure 22:
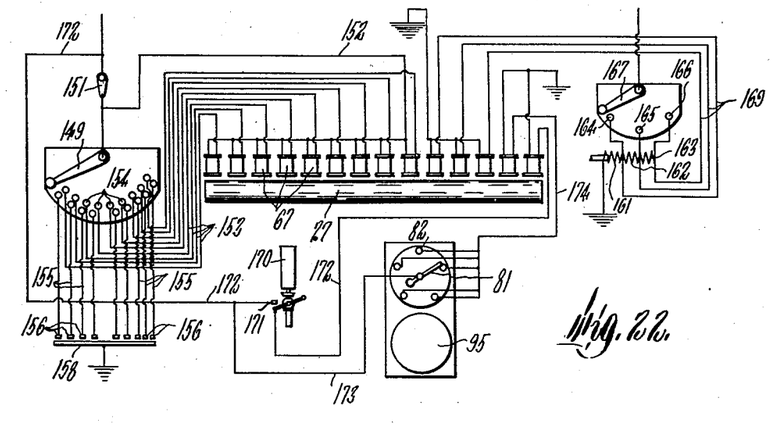
Figs. 22 and 23 are diagrams showing in separate detail certain duplicate circuits and appliances which are shown collectively in Fig. 1.
Figure 23:
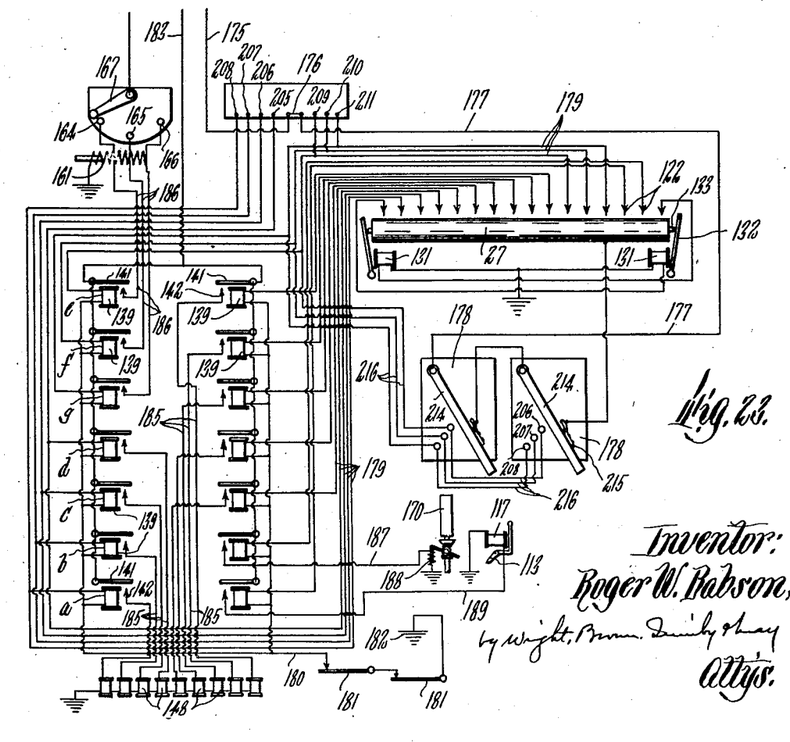

Illustrative diagrams of electrical connections, sufficient to enable those skilled in the art to construct and use this invention, are shown in Figs. 21, 22 and 23. The diagrammatic representations here of such of the mechanical parts and members as are elsewhere shown in detail, are designated by the same reference characters as used in the figures which illustrate their structure. In Fig. 21 a trolley wire typifying a supply conductor of any character is shown at 144 and one of the rails of the track, typifying a return conductor, at 145. 146 represents the car propelling motor and 147 the resistance in the field of the motor, portions of which are short circuited or put into circuit by means of a series of relays, in the standard equipment, under control of the motorman, to start and stop the motor and regulate its power and speed. I have shown at 148 (Fig. 21) one of such relays, typifying all those (shown in Fig. 23) with which the motor equipment is provided, and at 149 the handle or lever of the motorman's controller by which the several relay switches are put into and out of action. I have not attempted here to show the connections between the controller and the motor relays, for this invention involves nothing new in regard thereto, but is adapted and applied to the motor controlling equipment which is already standard and in general use. Such equipment provides for an "off" position, and nine different circuit-making positions of the controller handle, and the present embodiment of my invention is adapted thereto, making a record of the placement of the controller handle in each of these circuit-making positions and causing an automatic reproduction of the effects due to such placement of the handle. However, the principles of the invention are equally adaptable and applicable to any other type of motor controlling equipment.

Tracing out now the circuits employed in making the original record, current is taken from the supply or positive side of the circuit through a resistance 150, which cuts it down to say half an ampere, and through a switch 151 to a conductor 152 leading to connections with all those of the printing magnets 67 which record the operations of the motor controller. The return leads 153 from the magnets of this group lead to contact points 154 in the controller, each of which is put in circuit with a further return conductor by the controller handle when the latter is in any one of its positions other than the "off" position. One of such further conductors is shown in Fig. 21 at 155 leading from a contact which registers with the first "on" position of the controller handle, to an insulated switch contact 156 operated by the first of the motor governing relays 148. When this relay magnet is energized to close the switch at 157 to cut out the starting resistance of the motor, the gap between 156 and a complemental contact 158 is closed, completing the return circuit of the printing magnet 67. Similar return connections are provided for each of the other magnets from the controller to the several motor relay switches, which are shown in Fig. 22, but omitted from Fig. 21 in order to avoid confusion.

Likewise, in order to avoid confusion, the terminals of all the return connections shown in these diagrams have been indicated as connected to ground.

An air brake valve is shown conventionally at 159 as connected with the core 160 of a progressive solenoid having windings 161, 162 and 163, adapted to shift the valve more or less according as all or less than the whole number of windings are energized. These windings are separately connected with terminal contacts 164, 165 and 166 arranged to be engaged successively by a switch lever 167, to which current is led from the main supply through a resistance 168 which reduces the voltage and current to an amount sufficient but not excessive for working the valve. A current of 2 amperes is usually used for this purpose. Conductors 169 lead separately from the last named terminals in parallel with the solenoid magnets to different ones of the printing unit magnets, whereby each operation and stage of operation in setting and releasing the brake is recorded.

170 represents conventionally a whistle and typifies an electrically operable or controllable device of any character for giving a warning signal. Associated with the operating means of this signal is a switch 171 which, when the signal is operated, closes a low voltage conducting line 172 leading to the magnet of still another one of the printing units.

The time recorder, previously described, is here shown as having its revolving brush 81 connected to the low voltage current supply by a conductor 173, and its complemental contacts 82—86 as connected to a single conductor 174 leading to still another printing unit magnet.

In Fig. 21 one of the control contact wheels 122 is shown in connection with its supporting means to represent and typify the entire bank or set of duplicate contact means, without duplication; and in like manner one of the relays 139 is shown to typify the entire set of control contact-operated relays. Fig. 23, however, indicates by arrow heads all the contact devices, and shows all the circuits and relays with which they are connected. Current for all of the circuits controlled by these contact devices is taken from the low voltage supply passed through the resistance 150, through a line 175 to which current is directed by throwing the switch 151 into the dotted line position (Fig. 21). This line continues to a normally closed switch 176 (the purpose of which is later described) and thence by a conductor 177 through an emergency switch 178, or a series of such switches, to the bed cylinder 27. From the several contact elements 122 separate wires 179 run to the positive terminals of the several relay magnets 139, except only as to the endmost contact elements, (those which control the tracking of the record sheet) the equivalent wires from which elements run directly to the tracker magnets 131. The common conductor 180 from the negative terminals of all the relay magnets of this group leads through an alternative emergency switch 181 to a return connection, represented as a ground at 182. The said emergency switches, as also previously mentioned switch 176, are provided for the purpose of super control by the attendant of the car, but before describing them, the description of the automatic control means will be completed.

Current is delivered to the positive side of all these relay switches by a conductor 183 which receives current from the main supply through a resistance 184 in an amount sufficient but not excessive for operating the magnets by which the power circuits of the car motor, the brake, the signal, and the schedule affecting device are directly controlled. Separate conductors 185 lead separately from different relay switches 142 to the several motor controlling magnets 148. Other conductors 186 lead from other relay switches to the several connections of the air brake solenoid. Another connection 187 leads from another one of the relay switches to an electrical device, such as a solenoid or magnet 188 for operating the signal 170; and another conductor 189 leads from still another relay switch to the magnet 117 by which the propelling pawl 113 for the disk 95 is driven.

The electrical part of the means which automatically affects the power development of the car when behind or ahead of its schedule is here shown as comprising additional resistance units 190, 191, 192 and 193, in series with the standard resistance of the motor. Two of these resistance units are adapted to be short circuited by closing of normally open switches 194 and 195, while the other two are normally short circuited by closed switches 196 and 197. The first two switches are adapted to be closed by magnets 198 and 199, while the other two are adapted to be opened by magnets 200 and 201. All of these magnets receive current from a common supply line 202. The several magnets are coupled by connections clearly shown with the several segments 97, 98, 99 and 100, of the disk 95, while the traveling contact arm 108 is connected to the return circuit.

By these means the car is automatically controlled in all particulars after it has been started; including the application of brakes for bringing it to a stop. But as movement of the record is an essential to initiate the action of the various controlling agencies, further means, controllable by the attendant, for starting the car after it has been stopped are necessary. Operator controlled means for stopping the car at will are also a practical operating necessity. I have provided means for these and other purposes in the switches 176, 178 and 181 previously mentioned, and in other devices associated therewith which I will now describe. Switch 176 is adapted to be opened by a push button 202, or equivalent switch controller which, when pressed upon for that purpose, closes a switch 203 whereby connection is made between the line 175 and a conductor 204 at the same time that connection with line 177 is broken. For convenience of description I call the switch 202 a push button change switch. Branches in parallel from the conductor 204 and controlled by switches, preferably of the push button type, 205, 206, 207 and 208, lead to those of the relay magnets 139 (identified at $a$, $b$, $c$, and $d$ in Fig. 23) by which the first four stages in the starting and acceleration of the motor are controlled. Other branches, controlled by switches 209, 210 and 211 of similar character, control circuits including those of the relay magnets 139 (similarly identified at $e$, $f$ and $g$) which control the brake application. Thus the attendant, by pressing successively on the buttons 205, 206, 207 and 208, while holding the button 202 depressed at the same time, may start the car and give it an acceleration. Having thus started the car, release of the change switch button puts the automatic means again in action and enables the car to be continued in motion automatically to the next stopping place. Or the attendant, while depressing the change switch button 202, may press the air brake buttons 209, 210 or 211 and stop the car at will. Preferably these push button switches are arranged in a box 212 (Fig. 1), mounted on a support 213 near the station which the attendant normally occupies; and preferably also the buttons are so arranged that they may be manipulated by the digits of one hand.

Switch 178 is an emergency switch for quickly shutting off the power from the motor and applying the brakes in case of danger. Two or more of these switches may be located at points of convenient access in the car, as shown in Fig. 1, and connected in series circuit, as shown in Fig. 23. Each of such switches comprises a switch lever 214 which, when all are placed against their complemental contacts 215, complete the circuit to the bed roll 27, from the conductor 177, but either of which when moved away from its contact breaks this circuit, thus putting all of the record controlled contacts out of action, and on further movement couples the conductor 177 successively with one after another of three conductors 216 which lead to those of the relay magnets 139 (designated as $e$, $f$ and $g$) by which the air brake solenoid 161—163 is energized.

There may be two or more of the switches 181, electrically connected in series, as shown in Fig. 23, and located at the attendant's station, at the ends of the car, or in any other convenient locations. They are preferably of the push button type and are opened by pressing the button, thus breaking the return connection of the relay magnets 139 and making them inoperative. One or another of these switches may be pressed by the car attendant when out of his usual station, as, for instance, at the forward end of the car when approaching a usual stopping place, in order to prevent the brakes from being applied and permit the car to coast by the stopping place if there are no passengers waiting there and none on the car to be left at that point. This switch and the others like it may be called the cutout switch as a convenient term to distinguish it from the emergency switch proper, the utility of which is to stop the car quickly in an emergency.

The diagram of electrical circuits and connections thus described is intended to be informative rather than exclusive or exhaustive. That is, it shows one of the many possible ways in which the desired effects may be obtained, but other arrangements of circuits which may be devised for the same ends by the skilled electrician are within the view and scope of the invention.

This control system is particularly applicable to car lines which run over an exclusive right of way where unscheduled stops are relatively infrequent. However, the supervisory control permitted by the attendant's push button switches makes it usable under any conditions where it is economically feasible to do so.

Within the meaning the word "stations," as used in this specification, I include all the normal stopping places of the car, whether the ones primarily intended for taking on and leaving passengers, or those which may be compelled by intersecting lines of traffic.

Such movements of the car as have to be made before or after an automatically controlled run, such as shifting into a car barn or on a side track when temporarily out of service, and back to the starting point of the run, may be performed either by a motorman in the usual way, using the hand controller, or by operation of the push button switches, the record strip being disconnected from the propelling shaft in either case.

When, prior to the beginning of a run, the car has been brought to the starting point, the record take-up spool is coupled to the driving shaft. At the end of the run it is rewound on the supply spool.

The same record strip, or duplicate records, may be used on all cars of the same type when used on the same run. After the record has once been made, and as long as the same car continues to be controlled by a particular record, the printing devices need not again be used in that car. But the equipment which embodies my complete invention enables any car in which it is installed to be used for making such a record for use on any run.

Fig. 2 shows in diagram a plan of a section of trackway with two stations 218 beside the track, and a number of signals 219 operated by the car in its passage along the track through means of known, or other suitable, character. The signal devices thus shown conventionally typify generically any and all signals or safeguards which may be provided along the right of way to be operated by the automatically controlled car, as stated in the introductory part of this specification. A car is shown in full lines at 220 beside one of the stations and in dotted lines beside the other of the stations represented in Fig. 2.

Having now described in complete detail a specific embodiment of all the combinations comprised within this invention, I wish to state again that the invention is not limited to this embodiment or even to the entire combination of all the features here described; but that I claim protection for the principles thereof in all forms, and all operative partial combinations of the apparatus. For instance, it is within my contemplation to employ reversals of the mechanisms and operations herein described such that imprints may be made only when the motor controlling circuits are open, and that the record controlled devices will actuate the several circuits when supported by the record instead of when entering perforations therein. Or I may make the record of electrically conductive material and use it as a conductor for the currents of the automatic control, with interruptions of the circuit when the contact devices enter its perforations. It is to be understood also that the principles embodied in the apparatus herein described may be applied to other analogous purposes within the scope of the invention and the range of equivalents covered by the appended claims, as explained by the foregoing specification. While I have particularly specified an electric car as the vehicle in which the apparatus is embodied, I wish to say that I consider to be equivalent to an electric car other self propelled vehicles in which the prime mover may be started, stopped and its power output regulated by electrical means, according to the principles of the means here described.

What I claim and desire to secure by Letters Patent is:

1. The combination with an electric railway car having a plurality of manually governed motor controlling circuits, of a plurality of printing devices in separate connection with the several motor controlling circuits, and means for supporting and propelling a record strip in position to receive the impression of said printing devices.

2. The combination with an electric railway car, of means for propelling a record strip, means for marking on said strip a record of the actions initiated by a driver in operating said car, and means controllable by the record so made for automatically reproducing such actions.

3. The combination with an electric car having control means placeable by a driver into different positions for starting, and varying the speed of the propelling motor, and means likewise placeable by the driver into different positions for causing the brakes to be applied, of means for propelling a record strip simultaneously with the car, and automatic means for marking separately in different locations transversely on said strip a record of the placement of the said motor governing and brake applying means in such different positions.

4. The combination with an electric car having manually controllable switches for governing the speed of the motor, of means for supporting and propelling a record strip at a speed proportional to the travel of the car, a series of printing devices arranged for independent operation to mark said record strip in different locations across the width thereof, means for causing different ones of said printing devices to be operated when different ones of said circuit controlling switches are operated, and a time controlled device for causing another one of said printing devices to mark the record strip at given time intervals.

5. The combination with an electric railway car having manually controlled motor governing switches and a manually controlled electrically operated signal, of means for supporting and propelling a record strip at a speed proportional to the speed of the car, a set of electrically governed printing devices arranged to mark said strip in different locations across the width thereof, and controlling electric circuits for the several marking devices in connection, respectively, with the several controlling means for the motor switches and for the signal.

6. An automatic control means for electric railway cars comprising a prime mover, electric control means for governing the speed of said prime mover, a slotted record sheet, means for propelling said sheet at a speed proportional to the rate of progress of the car, complemental contact means at opposite sides of the sheet accessible to one another through the slots therein, and means put into action by completion of said electric circuits by said contact means for setting said electric control means in action according to a predetermined plan.

7. The combination with an electric railway car, of electric circuit closers in initiating relation to control operation of the car propelling and stopping means, a record sheet having means for opening and closing said circuit closers, and means for propelling said record strip coincidently with the movement of the car.

8. In combination with an electric railway car having an electric driving motor, an automatic control means for governing the speed of the motor in normal operation, and a time governed auxiliary schedule-regulating means for additionally varying the electric current passed to the motor.

9. The combination in an electric railway car carrying an electric driving motor with automatic means on the car for controlling the speed of the motor, of superior means operable by an occupant of the car for disabling said automatic means.

10. The combination in an electric railway car carrying an electric driving motor with automatic means on the car for controlling the speed of the motor, of superior means operable by an attendant for disabling said automatic means and substituting independent manual controlling means.

11. The combination with an electric railway car, of a record strip propelled by the travel of the car, a series of circuit closers governed as to their circuit closing and opening actions by said record, electric motor controlling circuits governed by the circuits controlled by said circuit closers, manually controllable switches in substitute relationship with said circuit closers for operating the motor governing circuit, and a change switch operable by the attendant of the car for substituting said manual switches for the record governed circuit closers.

12. The combination in an electric railway car carrying an electric driving motor, of automatic means for governing the speed of the motor and applying the brakes of the car, and manual means for disabling the automatic means and starting the car through the governing circuits controlled by said automatic means.

13. The combination with an electric railway car, of a controller record, means controlled by said record for governing the speed of the motor and the application of the brakes of the car, other and manually controlled circuit closers for governing the same means, and a manual change switch for disabling the record governed means and substituting said manual means.

14. In a control system for electric railway cars, the combination with a circuit closer of a record sheet propelled by the motion of the car having means for operating said circuit closer at time intervals dependent on the speed of the car, one contact member of an electric circuit driven through equal steps with successive actions of said circuit closer, a clock driven complemental contact member propelled at a uniform rate and adapted to complete or break the circuit through the first contact member when the latter is propelled at a different rate, and means whereby the closing together and separating of said contact members varies the power input of the motor.

15. The combination in an electric car controlling system, of a record sheet, an electrically controlled printing device for marking on said sheet, time controlled circuit closing means in circuit with the printing means for actuating the latter at regular intervals of time, the record sheet being propelled at a rate proportional to the progress of the car, and means governed by perforations in said record sheet at the points so printed thereon for accelerating or retarding the car motor when the progress of the car fails to keep pace with that made during the printing of said time indications.

16. An electric car controlling system having automatic means for regulating the speed of the motor in accordance with a predetermined time schedule and other automatic means for varying the current input to the motor when the progress of the car differs from the contemplated progress of such schedule.

17. An electric car controlling system comprising automatic means for controlling the starting, stopping and speed of the motor and brake of the car, and a manually controlled emergency switch having means for both disabling said automatic means and causing application of the brake.

18. The combination with a self propelled vehicle having a prime mover and an operator-actuated controller placeable in different positions for causing said prime mover to run at various speeds, of a record sheet, means for propelling said sheet at a rate proportional to the rate of travel of the vehicle, and a series of printing members severally operable by said controller arranged to mark in different positions on said sheet a record of the various positions occupied by said controller during the travel of the vehicle.

19. A self propelled vehicle having a driving motor and a brake-applying means, and combined with a series of elements controlling said brake-applying means and operable successively for causing application of the brake with increasing force, a record sheet on the vehicle, means for driving said sheet at a rate proportional to the rate of travel of the vehicle, and a series of printing means arranged to make imprints on the record sheet in different positions and connected for actuation severally with the actuation, respectively, of said controlling elements.

20. A self propelled vehicle having a brake and brake-applying control means movable into different positions for setting the brake with different degrees of force, combined with a movable record sheet on the vehicle, means for propelling said sheet at a rate proportional to the rate of travel of the vehicle, and a series of printing devices arranged to make imprints on said sheet in different positions transversely of the movement thereof, connected for operation severally by the placement of said control means in its different operative positions.

21. A self propelled vehicle having a driving motor, a brake, a manual motor controller shiftable into different positions for causing different amounts of power output by said motor, and a manual brake controller shiftable into different positions for causing brake applications of various degrees of force, combined with a record sheet, means for propelling said sheet at a rate proportional to the progress of the vehicle, and a series of printing devices arranged to imprint said sheet in different locations transverse to its direction of travel, and means for causing actuation of said printing devices connected separately to the several devices and separately arranged in association with the several positions of said controllers, for making a record on the sheet of the placement of said controllers in their different positions.

22. An electric car having an electric propelling motor and a controller placeable in different positions for controlling the speed of the motor, combined with a traveling sheet carried by the car and a series of printing devices separately actuated by the placement of said controller in each of its motor controlling positions and arranged to make imprints at respectively different locations on the sheet transversely to the direction of travel thereof.

23. In a self propelled vehicle, a brake, a series of electro magnetic means operable successively for applying the brake with different degrees of pressure, and a controller shiftable into a number of different positions for putting said means into or out of action successively, combined with a record sheet and printing means arranged to imprint said sheet in respectively different positions transversely to its direction of travel coupled with said brake-applying means for recording the placement of said controller in its different positions.

24. In a vehicle having a propelling motor, manual means for putting said motor into and out of operation and controlling its speed, electro magnetic means for effecting the same control of the motor, a support for a traveling sheet in electrical connection with said electro magnetic means, and interchangeable printing devices and contact devices adapted to be placed in cooperative relation with said support and in substitution for one another.

25. In a vehicle having a propelling motor, manual means for putting said motor into and out of operation and controlling its speed, electro magnetic means for effecting the same control of the motor, a support for a traveling sheet in electrical connection with said electro magnetic means, and interchangeable printing devices and contact devices adapted to be placed in cooperative relation with said support and in substitution for one another; the printing devices being operable electrically by said controller for printing on the sheet a record of placement of the controller in its different positions, and the contact devices being adapted to make contact with the support through holes in the sheet and being in electrical circuit with the support and the said electro magnetic means.

26. The combination with a vehicle having a propelling motor and electrical means for controlling said motor, of a perforated record strip, a bed over which said strip passes having an electrically conductive surface in electrical connection with said electrical means, means for propelling said strip over the bed at a rate proportional to the travel of the vehicle, and a series of contact devices in electrical connection with different ones of said electrical controlling means bearing against the record strip and adapted to make contact with the bed through perforations in the strip.

27. A self propelled vehicle having a driving motor, a perforated control sheet, propelling means for said sheet operated by the vehicle in its travel, and means by which perforations in said sheet control the operation of the motor.

28. A self propelled vehicle having a driving motor, a brake, and means for varying the power output of said motor and for applying the brake, combined with electrical means including a series of contact devices for causing changes in motor speed and brake application, and a control sheet propelled by the travel of the vehicle and having perforations in lines adjacent to the positions of said contact devices, the perforations in said sheet being located to cause acceleration, deceleration and stoppage of the motor, and application of the brake, at predetermined points in the run of the vehicle.

29. A self propelled vehicle having a driving motor, a movable controller record mounted on the vehicle, means operated by the progress of the vehicle for propelling said record at a rate proportional to such progress, and means governed by said record for accelerating, decelerating and stopping the motor at predetermined points in the run of the vehicle.

30. A self propelled vehicle having a driving motor, a movable controller record mounted on the vehicle, means operated by the progress of the vehicle for propelling said record at a rate proportional to such progress, means governed by said record for accelerating, decelerating and stopping the motor at predetermined points in the run of the vehicle, and independent means operable by an occupant of the vehicle for starting said motor after stoppage of the vehicle.

31. An electric railway car having a motor and electrical motor controlling devices for starting and stopping the motor and varying its speed, contact elements in circuit with the several motor controlling devices, a conductor complemental to said contact elements in circuit with said devices, a non-conducting sheet passing between said devices and conductor, means for propelling said sheet by the car in its travel and at a rate proportional to such travel, said sheet having perforations adapted to permit entrance of the several contact elements into contact with said conductor and arranged along the sheet in positions arranged to effect speed changes and stoppages of the motor at predetermined points in the travel of the car.

32. An electric railway car having a driving motor and electrical means for controlling its speed and having a brake and electrical means for applying said brake, combined with a series of initiating devices for initiating action of different ones of the motor controlling and brake applying means, a control record sheet on the car, and means for propelling said sheet proportionally to the travel of the car, said sheet having provisions for actuating different ones of said initiating devices to cause acceleration, deceleration and stoppage of the car at points in its course of travel according to a predetermined plan.

33. An electric railway car having a driving motor and electrical means for controlling its speed and having a brake and electrical means for applying said brake, combined with a series of initiating devices for initiating action of different ones of the motor controlling and brake applying means, a control record sheet on the car, means for propelling said sheet proportionally to the travel of the car, said sheet having provisions for actuating different ones of said initiating devices to cause acceleration, deceleration and stoppage of the car at points in its course of travel according to a predetermined plan, and means independent of said record adapted to be operated by a person on the car for starting and stopping the motor and applying the brake.

34. An electric railway car having a driving motor and electrical means for controlling its speed and having a brake and electrical means for applying said brake, combined with a series of initiating devices for initiating action of different ones of the motor controlling and brake applying means, a control record sheet on the car, means for propelling said sheet proportionally to the travel of the car, said sheet having provisions for actuating different ones of said initiating devices to cause acceleration, deceleration and stoppage of the car at points in its course of travel according to a predetermined plan, and push buttons in parallel electric circuit with the record control means for starting and accelerating the motor and for applying the brake.

35. An electric railway car having a driving motor and electrical means for controlling its speed and having a brake and electrical means for applying said brake, combined with a series of initiating devices for initiating action of different ones of the motor controlling and brake applying means, a control record sheet on the car, means for propelling said sheet proportionally to the travel of the car, said sheet having provisions for actuating different ones of said initiating devices to cause acceleration, deceleration and stoppage of the car at points in its course of travel according to a predetermined plan, and an emergency switch having means for breaking the electric circuit of the record controlled motor governing means and completing the circuit of the brake applying means.

36. In an electric railway car having an electric driving motor, means for maintaining an approximate schedule of the car comprising resistance in the circuit of the motor, switches for cutting in and short circuiting such resistances separately, and a master switch driven by cooperation of a timing means and a prescribed time-speed record for cutting such resistances into or out of the motor circuit according as the car exceeds or lags behind the prescribed schedule.

37. A schedule maintaining switch for the purpose set forth comprising a rotatable contact element in one side of a controlling electric circuit, a complemental contact element in the other side of said circuit, means for driving one of said contact elements at a uniform rate, and a record controller driving the other element, said record controller having impulse initiating parts which pass a given point at a uniform rate when the car travels at the scheduled rate of speed.

38. A schedule maintaining device for electric cars comprising a record sheet driven by the progress of the car and having perforations spaced apart from one another at distances such that they pass a given point at equal time intervals when the progress of the car conforms to a given schedule, a rotatable switch contact, means controlled by the perforations of said record for giving equal increments of movement to said switch contact when said perforations pass a given point, a complemental rotary switch contact, means for rotating said complemental contact at a uniform rate of speed, and means in circuit with said switch contacts for cutting a resistance into and out of the circuit of the car driving motor when said switch contacts touch one another and separate respectively.

39. In a vehicle, a signal device, electro magnetic means for operating said signal device, complemental electrical contacts in circuit with said electromagnetic means, a non-conducting record sheet passing between said contacts, and means for propelling said sheet; the sheet having perforations arranged to permit circuit closing engagement between said contacts at predetermined times.

40. In a vehicle controlling apparatus, a record strip, means for propelling said strip endwise, a series of printing devices arranged crosswise of the strip for imprinting thereon in locations spaced at predetermined distances from the edges of the strip, and automatic means for causing the strip to track in a given alinement with said locations.

41. In a vehicle controlling apparatus, a perforated record strip, means for propelling said strip endwise, a series of electrical contact devices engaged with said strip and adapted to project through the perforations thereof, and tracker means for causing the strip to travel in a predetermined path such that the perforations therein register with the respective contact devices.

42. In an automatic vehicle controlling system, a record strip, means for propelling said strip, means for imprinting on said strip in zones parallel to the length thereof and spaced apart laterally, contact devices interchangeable with said printing devices for engaging said strip and passing through perforations cut therein at the locations of the imprints made by the printing devices, and tracker means for maintaining the strip in the same path while passing the contact devices as while passing the printing devices.

43. The method of automatically controlling the operations of a self propelled vehicle carrying a driving motor which consists in imprinting dots or stripes on a record sheet in locations thereon corresponding to the occurrence of various operations performed in controlling the speed and travel of the vehicle, and the locations in the route of the vehicle where such operations occurred, perforating the record sheet at the spots so printed upon, and using said sheet or a duplicate thereof to reproduce said operations through automatic means controlled thereby.

44. The method of effecting automatic control of self propelled vehicles carrying driving motors which consists in mounting a record sheet on such a vehicle and propelling such sheet in harmony with the travel of the vehicle, making imprints on the sheet in different locations transversely of its direction of travel appropriated to different operations performed in the control of the vehicle, at the time of performance of such operations, then perforating said sheet at the spots printed upon, and mounting such sheet or a duplicate thereof on the vehicle, propelling it in the same manner as when the imprints were made, and effecting electrical contact, through such perforations as they pass a given point, between circuit closing means in electric circuits organized to reproduce said operations.

45. The method of automatically controlling self propelled vehicles which consists in making a record of the operations manually performed in driving the vehicle over a given route, and subsequently using the same record or a duplicate thereof for reproducing such operations through automatic means during subsequent travel of the vehicle over the same route.

46. The combination with an electrically operated vehicle having a plurality of controlling electric circuits, of a supporting frame mounted in said vehicle, a bed of electrically conductive material mounted in said frame and connected electrically with one side of said circuits, a perforated record strip, means for causing travel of said strip over said bed, and a series of contact devices connected in different ones of said electric circuits adapted to bear on said record strip and to pass through perforations therein into contact with said bed for completing the circuits in which they are respectively connected.

47. The combination as set forth in claim 46 comprising further a bar detachably mounted on the sides of said frame to which the said contact devices are secured and with which the latter are detachable from the frame as a unit.

48. In a vehicle having a propelling motor, electro-magnetic means for controlling said motor, a support for a traveling sheet in electrical connection with said electro-magnetic means, a plurality of contact devices connected in separate circuits with different elements of said electro-magnetic means adapted to make contact with said support intermittently as permitted by said traveling sheet, and a single bar on which all of said contact members are mounted with provision for the necessary relative movement for the above mentioned coaction with the support and sheet, said bar being detachably mounted in cooperative relationship with said support.

In testimony whereof I have affixed my signature.

ROGER W. BABSON.